July 30, 1968     J. H. LANDON     3,394,953
COUPLINGS FOR POLYOLEFIN PIPES AND FITTINGS
Filed Nov. 19, 1964
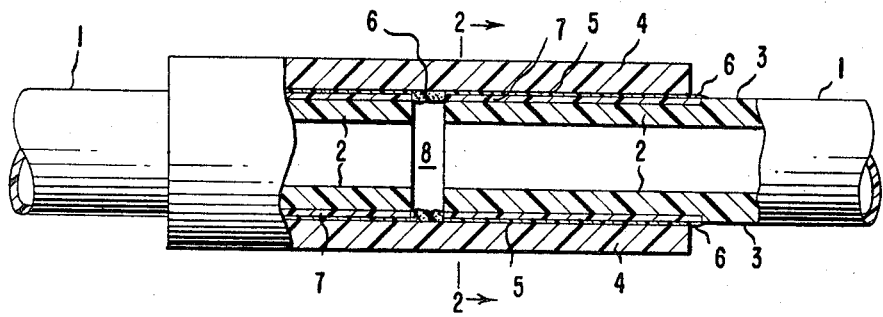
FIG. 1
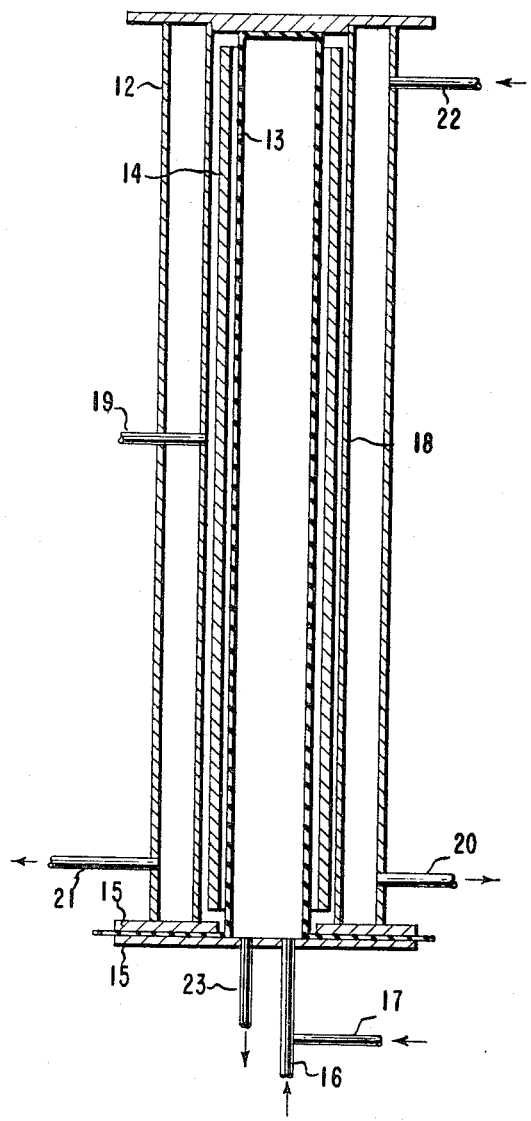
FIG. 3
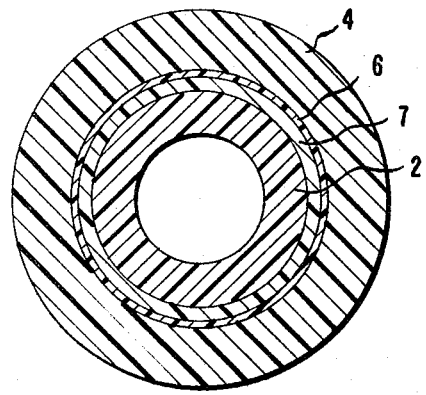
FIG. 2
*INVENTOR*
JOHN HENRY LANDON
ATTORNEY

United States Patent Office 3,394,953
Patented July 30, 1968

3,394,953
COUPLINGS FOR POLYOLEFIN PIPES
AND FITTINGS
John Henry Landon, Richmond, Va., assignor to E. I. du
Pont de Nemours and Company, Wilmington, Del., a
corporation of Delaware
Filed Nov. 19, 1964, Ser. No. 412,483
6 Claims. (Cl. 285—286)

ABSTRACT OF THE DISCLOSURE

A pipe coupling composed of a polyolefin pipe section and a sleeve which fits over an end of the pipe section. Fused to the outer surface of the end of the pipe section is an adhesive which is a co-polymer of ethylene and an ethylenically unsaturated aliphatic acid. An intermediate layer of an epoxy adhesive joins the pipe to thte sleeve.

This invention is concerned with couplings for joining polyolefin pipe sections together or to other fittings such as valves, elbows and the like.

Many types of pipe or tubing couplings are available for connecting plastic pipes or other fittings together. The present invention, however, is concerned with couplings which do not require threading of the pipe and do not require flanging or tapering. The invention is particularly useful for coupling pipes of large diameter (such as 3 inch or larger) where considerable end thrust may develop.

French Patent 1,353,231 of Woodell, corresponding to U.S. application Ser. No. 180,172, filed Mar. 16, 1962, now U.S. Patent No. 3,183,941 describes a light-weight polyolefin pipe which affords a particularly high hoop strength although fabricated with relatively thin walls in large diameters. The use of such pipe in oil fields or irrigation projects is particularly advantageous because of its light weight and the ease with which it may be moved from one location to another. In many installations such piping will be used above ground. Since the pipes in such uses are not held rigidly in position by earth around them, and since the pipes are somewhat flexible, excessive water or oil pressure will cause the pipe sections to blow apart and separate from one another unless properly joined.

An objective of the present invention is to enable, in a simple and economical fashion, the coupling of polyolefin pipes, tubes, or pipe fittings. Other objects pertain to the achievement of a coupling that will withstand considerable hydrostatic pressure, resist growth at high pressure, and resist the tendency of fluids at high pressure to separate the inner coupling walls from the outer polyolefin pipe wall. Still a further object is the provision of a coupling that will resist end thrust, i.e., the polyolefin pipe joint should withstand a shear stress of at least 50 p.s.i.

In accordance with the invention there is provided a pipe coupling for confining fluid therein comprising an inner pipe section having an end of generally cylindrical outer circumference, an outer pipe section of generally cylindrical inner circumference for receiving the end of the inner pipe section in close fitting relationship, and an intermediate layer of epoxy adhesive securely joining the pipe sections, the outer pipe section is selected to exhibit a growth of less than 5% at 3000 p.s.i. and 70° C. and, of course, to have an inner surface which is adherent to epoxy adhesive. The inner pipe section comprises a polyolefin tubular body having fused thereto an outer surface layer comprising an ethylene/acid copolymer with a major proportion by weight of polymerized units of ethylene, and 1 to 8% by weight of polymerized units of an alpha, beta-unsaturated aliphatic acid of 3 to 8 carbon atoms per molecule. The copolymer should have a melt index of 0.01 to 30 grams/10 minutes and the layer thereof should be at least 25 microns thick.

The invention has particular applicability when the polyolefin pipe or fluid conduit, e.g. a tubular-shaped structure, is formed of plexifilamentary material as described in U.S. Patent 3,081,519. The plexifilamentary material is composed of networks having a surface area greater than 2 m.²/g. and comprising a three-dimensional integral plexus of fibrous elements, e.g., of a crystalline polyolefin. The fibrous elements are characterized as being coextensively aligned with the network axis, having the structural configuration of oriented film-fibrils, and further as having an average film thickness of less than 4 microns and an average electron diffraction orientation angle of less than 90°. As a highly coherent tubular body of the fluid conduit, a layer or aggregate of the plexifilamentary material is formed and the fibrous elements thereof are heat-welded and compacted together at their crossover points, but not to such an extent that their orientation will be destroyed at the center of thickness of the layer. The density of the layer will be on the order of 0.65 to 0.90 g./cm.³.

The use of plexifilamentary material in the fabrication of tubular-shaped products is described in the aforementioned French Patent 1,353,231 and the corresponding U.S. application, the disclosures of which are incorporated herein by reference. Those tubular shaped products are advantageously formed by wrapping, e.g. spirally, a coherent aggregate of plexifilamentary material on a mandrel and applying heat and pressure. They are characterized by outstanding properties with respect to hoop strength, the hoop strength at burst (ASTM method D–1599–58T for incremental pressure) being at least 7,000 p.s.i. (493 kg./cm.²), and low weight as compared to prior art structures of similar dimensions.

The novel construction of the pipe couplings of the invention will be further evident from a consideration of FIGURES 1 to 3, inclusive, wherein:

FIGURE 1 is a longitudinal view of the coupling, partly in cross-section, comprising two pipe sections and a sleeve-like coupling member or fitting. (It will be noted that the thickness of the wall of the fitting and pipe have been exaggerated to better show details of construction.)

FIGURE 2 is a transverse cross-sectional view of the coupling taken along the line 2—2 of FIGURE 1.

FIGURE 3 is a view of an apparatus used to perform a heat bonding operation on a pipe section.

FIGURE 1 shows one embodiment of the coupling in which two sections of polyolefin pipe 1 are enclosed in an outer fitting 4, which has the form of a cylindrical sleeve. Each of the pipe ends 2 has a cylindrical outer surface 3. The periphery of the pipe, at least in the vicinity of the ends to be joined, comprises a layer 7 of ethylene/acid copolymer intimately fused to the polyolefin tubular body. The outer fitting 4 has an inner surface 5 which is cylindrical. Fully hardened or cured epoxy adhesive 6 fills the intervening layer between the two cylindrical surfaces and, to some extent, the separation 8 between the pipe ends.

The outer fitting 4 of the coupling is comprised of materials which have a growth of less than 5% as measured at 3,000 p.s.i. and 70° C. and which adhere tenaciously to epoxy resins. The low growth requirement may be fulfilled by using materials with relatively high modulus or by making the outer fitting relatively thick. This low growth is important in pipes of diameter greater than 3″. For example, if the outer fitting grows due to hydrostatic pressure, fluid enters the area 8 between the two pipe ends and a blister may develop in the outer fitting which then becomes increasingly weaker as the diameter of the pipe increases under fluid pressure. The fitting may be machined from a cast cylinder or block of epoxy resin, or it may be machined from materials such as aluminum, cement asbestos or any rigid material to which epoxy adhesives will adhere. The fitting may also be formed by polymerizing epoxy or other resins in a mold.

The tubular body 1 of the fluid conduit may be comprised of any polyolefin with a melting point above 80° C. Isotactic polypropylene and linear polyethylene are preferred. It may be formed of extruded polyolefin, of fiber-reinforced polyolefin, or may be composed completely of fibrous or film-fibril material. Other polyolefin materials suitable for this purpose are branched polyethylene, blends of the branched and linear polyethylene, polyethylene copolymers such as those from ethylene/isobutylene, ethylene/octene and ethylene/decene. Copolymers of at least 90% by weight ethylene and up to 10% of an alpha-olefin with 3 to 12 carbon atoms per molecule are particularly useful for preparing pipe with low growth under pressure.

Ethylene/acid copolymer

Copolymers of ethylene and an alpha, beta-unsaturated aliphatic acid useful in the present invention are fully described in Canadian Patent 655,298, issued Jan. 1, 1963. The copolymer must exhibit adequate adhesive properties and for this reason must have a melt index of 0.01 to 30 grams/10 minutes. The layer 7 of copolymer must also be of sufficient thickness in the pipe, usually at least 25 microns thickness and frequently up to 300 microns or more. Copolymers useful in the present invention must contain a major proportion, i.e. at least 70%, by weight of polymerized units of ethylene and 1 to 8% by weight of polymerized units of the unsaturated aliphatic acid. While copolymers with at least 70% ethylene are satisfactory for bonding, it is preferred to have more than 85% ethylene in the copolymer to keep the melting range suitably high. Typically suitable ethylenically-unsaturated aliphatic monomers are acrylic acid, methacrylic acid, crotonic acid, maleic acid, fumaric acid, itaconic acid and the methyl and ethyl hydrogen maleates and fumarates. A preferred material is a copolymer containing 95% by weight polymerized units of ethylene and 5% by weight of polymerized units of methacrylic acid.

It will be understood that the copolymer may contain other substituents besides ethylene and the $\alpha,\beta$-unsaturated aliphatic acid, provided that the ethylene and unsaturated acid constituents are present in the required proportion. For example the copolymer layer may be composed of 82% ethylene, 6% methacrylic acid, and 12% vinyl acetate. The methacrylic acid units need not be in the pure acid form. A very satisfactory product is made from partially neutralized polymer having by weight 90% ethylene, 7% methacrylic acid, and 3% sodium salt of methacrylic acid.

The copolymers as above described can be extruded in the form of film much in the manner of polyethylene. In this form they are particularly useful for combining with the polyolefin tubular body, e.g. by heat-fusing superposed layers. Preferably the copolymer will have a somewhat lower melting point than the polyolefin tubular body to which it will be fused. The partially neutralized polymers can be applied to the pipe in the form of an aqueous dispersion and then dried.

Pipe construction

Pipes comprising a polyolefin tubular body 1 having a layer of ethylene/acid copolymer fused about its outer periphery, either at one or both terminal portions thereof or even fully along the length of the pipe, may be fabricated by known pipe-forming procedures. In one such procedure the plural layer structure can be extruded continuously e.g. from a pair of concentric annular orifices. Preferably, however, they will be formed by wrapping successive layers of appropriate sheet materials or strands onto a suitable mandrel followed by the application of heat and pressure to effect bonding. Sheets to be so bonded can be wide or they may be in the form of a narrow tape.

The latter procedure is described in aforementioned French Patent 1,353,231 in connection with the preferred plexifilamentary material but will be briefly described herein.

In the case of the preferred polyolefin tubular bodies formed of plexifilamentary material, strands are first formed by a flash-spinning process in which there is extruded a homogeneous solution of a fiber-forming polymer in a liquid which is a non-solvent for the polymer below its normal boiling point, at a temperature above the normal boiling point of the liquid, and at autogeneous pressures or greater into a medium of lower temperature and substantially lower pressure. The vaporizing liquid within the extrudate forms bubbles, cools the extrudate as the bubbles expand, causing solid polymer to form and finally breaks through the confining walls of the bubbles to form networks of polymeric fibrils.

The flash spun products are characterized morphologically by their three-dimensional network for film-fibril elements. These networks may exist in various forms, but in all cases the film-elements are extremely thin. On the average the thickness of the film elements is less than 4 microns. In the preferred products the film elements are less than 2 microns thick. The plexifilaments have an internal fine structure or morphology which may be characterized as a three-dimensional integral plexus consisting of a multitude of essentially longitudinally extended interconnecting random length fibrous elements (so-called "film-fibrils") which have the form of thin ribbons of a thickness less than 4 microns. The film-fibrils, often found as aggregates, intermittently unite and separate at irregular intervals called "tie points" in various places throughout the width, length and thickness of the strand to form an integral three-dimensional plexus. The film-fibrils are often rolled or folded about the principal film-fibril axis, giving the appearance of a fibrous material when examined without magnification. Plexifilamentary strands are unitary or integral in nature, meaning the strands are one piece of polymer, are continuous in nature, and the elements which constitute the strands are cohesively interconnected.

The plexifilamentary strands have a surface area greater than 2 m.$^2$/g., as measured by nitrogen adsorption methods. Due to the extremely high polymer/air interfacial area the strands have marked light scattering ability and high covering power.

For purposes of this invention the plexifilamentary materials are preferably used as aggregates in sheet form. For example sheets may be made by direct lay-down of plexifilamentary strands on a moving belt after causing them to be spread by impingement on a baffle. This procedure is described in U.S. application Ser. No. 97,496, filed Mar. 22, 1961, now U.S. Patent No. 3,169,899. Alternatively, sheets may be made by cutting and beating plexifilamentary strands in aqueous suspension and by then forming sheets on a screen as in the normal paper-making operation.

The plexifilamentary materials may be made from a variety of thermoplastic and heat-weldable polyolefin materials, but preferably of crystalline polyolefins. Typically suitable polyolefins have been described above. With the crystalline polyolefins, polymer crystallites in the film-like elements are planar oriented. This orientation can be detected by electron diffraction techniques using standard X-ray diffraction theory. Electron diffraction is used instead of X-ray diffraction in studying the film elements since the film elements are too thin to give dense X-ray diffraction spots. In the fibrillated plexifilamentary material, the crystallites have more orientation in the direction of the strand axis than in any other direction within the plane of the film element. The electron diffraction arc is less than 90° for the film-fibril elements.

A film-fibril sheet employed for manufacturing a suitable fluid conduit should have a weight in the range 1 to 20 oz./yd.$^2$, a thickness of 10 to 200 mil, and a density between 0.15 and 0.6 g./cc. The wrapping or winding of the sheet into a tubular structure about a mandrel should be done under sufficient tension to give a compact material. Commercial equipment for forming tubular structures from sheets is readily available and many varieties exist.

After wrapping the film-fibril sheet material about a mandrel, a film of ethylene/acid copolymer film is placed about the periphery thereof. It may fully extend along the wrapped film-fibril structure or just at one or both ends. The unbonded tubular structure is subjected to internal and external pressure. While under pressure, heat is applied to the tubular structure and the temperature carefully adjusted to effect thermal bonding without fully destroying either the identity or orientation of the fine film-fibril elements composing the base layer of the tubular structure. This heat-bonding or welding is carried out at temperatures near the polymer melting temperature of the film-fibril material. The temperature at the center of thickness of the conduit wall should not exceed the polymer melting temperature of the film-fibrils lest complete de-orientation ensue and the advantageous strength properties which they provide be diminished.

It will be understood, however, that the temperature employed for the above-described heat-bonding must be high enough to (1) soften the outer film-fibril elements, and (2) effect a bonding or welding together of the inner film-fibril elements at their points of contact without destroying the fine films or their orientation and (3) to fuse the ethylene/acid copolymer bonding layer to the film-fibril material. In general the surface temperature of the conduit wall will be between 25° C. under the melting point and 10° C. over the melting point. The temperature used for the heat-bonding step will vary depending upon the type of polymer which comprises the fine film-fibrils. The time of exposure of the tubular structure to the heat-bonding temperature is a function of the rate of heat transfer, the thickness of the conduit walls and the method of heating, as well as the type of polymer. In a process operating within the temperature limits as above mentioned, the tubular material is advantageously heated between 0.1 and 30 minutes. It is preferred however, to operate with wall temperatures between 2° C. under the polymer melting point and 10° above the polymer melting point and with exposure times of less than five minutes.

The pressure employed during the heat-bonding depends on the type of polymer comprising the film-fibril elements and upon the degree of compaction or the density desired in the tubular structure. Pressures in the range of 20 to 100 p.s.i.g. have been found most suitable for preparing tubular structures from plexifilaments of linear polyethylene.

The tension applied to the sheet during wrapping or winding of the tubular structure and the pressure applied during heat-bonding, introduce stresses which help to maintain, frequently even increase, the orientation of the film-fibril elements in the conduit walls so as to develop maximum strength properties.

Devices for applying pressure simultaneously to the inside and outside of a tubular or hollow structure are well known in the art. Among such commercial devices are those having a rigid shell with an inflatable or otherwise expandable mandrel, or a rigid mandrel with external pressure rollers to give the external pressure. Heat may be supplied in many ways such as by steam, or by electrical heaters. Suitable commercial equipment also exists which can be utilized for a continuous process in which the wrapping and heat-bonding steps are integrated, permitting the production of continuous lengths of pipe.

After the heat-bonding step the tubular-shaped structure is cooled to a temperature well below the heat-bonding temperature before the internal and external pressures are reduced. When cool, the pressure is reduced and the tube is removed from the mandrel. If the pressure is reduced before the tube or pipe is sufficiently cool, shrinkage or distortion may occur.

Tubular products can be made in the foregoing manner to have diameters from ¼ inch to 4 feet, but are preferably 2 to 18 inches in diameter. The wall thickness can be 10 mils to 1 inch, but is preferably between 30 mils and 200 mils. The compacted heat-welded film-fibril layer alone will have a density of 0.65 to 0.90 g./cc.

The high tensile strength of the pipe wall produced in accordance with this invention permits construction of pipes having low weight per unit length while still having hoop strengths above 7,000 p.s.i., and in the preferred forms having hoop strengths of 13,000 p.s.i. to 40,000 p.s.i. As herein used, hoop strength relates to the actual stress in the pipe wall and is measured by Barlow's approximate formula:

$$HS = PD/2t$$

where $P$=fluid pressure at burst, lbs./in.$^2$ (gauge), $D$=outside diameter, inches, $t$=wall thickness, inches.

The outside of the conduit may be coated in a variety of ways for specific uses. For example, the outside coating may contain an ultra-violet screener, carbon black, pigments, or other fillers. The lined conduit in addition to handling gases without appreciable loss is completely leak-proof with liquids. For example water can be handled at pressures of 200 p.s.i. and higher depending on wall thickness.

A fluid conduit of particularly high strength may be prepared of film-fibril sheet materials by stretching the circumference 10 to 50% during the process of manufacture. Still higher strength properties may be obtained by stretching the film-fibril sheet product 10 to 100% in the lengthwise direction before winding about the mandrel.

In conduits made from plexifilamentary sheets the maximum hoop strength is obtained when more than 60% of the film-fibril elements in the finished pipe are oriented within 45° of the circumferential direction.

While a wide variety of oriented polyolefin materials may be used in the preparation of plexifilamentary strands, linear polyethylene is preferred for purposes of the present invention.

As employed herein, the melt index of the polymer is determined by the ASTM Method D–1238–57T, Condition E. The melt index is a measure of flowability for the molten polymer (grams per ten minutes) and is inversely related to molecular weight. The term "linear polyethylene" herein refers to polyethylene having densities of 0.94 to 0.98 g./cc. but preferably having densities of 0.95 or higher.

The plexifilamentary material in the example which follows was spun from a solution of 13% linear polyethylene (density 0.96 g./cm.$^3$, melt index 0.5) and 87% trichlorofluoromethane ("Freon" 11) according to U.S. Patent 3,081,519. The solution was provided continuously at a temperature of 185° C. and a pressure of 900 p.s.i.g. and spun through an orifice. The plexifilamentary strand was extruded continuously in the form of a three-dimensional network of film-fibril materials. The strand impinged against a baffle immediately upon formation and was thereby spread into a wide web. The web was collected on a moving belt in overlapping multidirectional layers. The belt was run at a speed sufficient to give a sheet having a weight 3.5 oz./yd.$^2$. This collected sheet was then passed through a pair of cold rolls to apply a pressure of 10 lbs./ linear inch of roll axis thereto. The resulting film-fibril sheet was used to make a 4 inch diameter pipe by a process which may be summarized as involving five separate steps including:

(1) Slitting the film-fibril sheet stock and the ethylene/acid copolymer film to make 4 inch wide tapes.

(2) Spiral winding tapes of the various components on a mandrel to make an unbonded pipe.

(3) Heat-treating the unbonded pipe under pressure in a mold to form a bonded pipe.

(4) Trimming the ends to shape the pipe.

(5) Heat-sealing the ends to prevent leakage.

The process described below is for making 4-inch diameter pipe. For pipes of higher diameter variations of this process may be needed. For example the tape width should be wider for higher diameter pipe. In general the tape width should be approximately the same as the pipe diameter.

The first step in making 4-inch diameter pipe consisted of slitting the various wide sheet stocks to make tapes 4 inches wide which were wound up in rolls. Next the unbonded pipe was prepared by winding ends of the tape about a collapsible mandrel on a winder. The tape is wound spirally as the mandrel turns, one or more ends of the tape being carried on a traversing creel. The winder is designed to spirally wrap several ends of tape around a mandrel 13-feet long in a single direction. The 13-foot length was chosen to allow for end trimming and end sealing to give a finished 10-foot pipe length. The mandrel has an expanded outside diameter of 3.0 inches. In operation the collapsible mandrel is rotated between 2 centers as in a lathe and the traversing creel is driven by a lead screw similar to the compound rest which traverses the cutting tool on a metal lathe. The machine is geared so that the traverse to wind ratio can be adjusted to give a definite pattern by changing sprockets. For the basic strength-imparting layer of the pipe, multiple rolls of 3.5 oz./yd.$^2$ film-fibril sheet, in tape form 4 inches wide are mounted on the traversing creel. The ends of the tape are fastened with pressure sensitive adhesive tape and spirally wrapped around the mandrel as it rotates and as the creel advances along its length. The tapes are then cut at the lower end and fastened with adhesive tape to the mandrel. The lead screw is then reversed and the creel returned to its starting position and the winding operation repeated until the desired number of wraps and weight have been built up on the mandrel. In an alternate process the creel can be reversed in successive winding operations to give a criss-cross pattern.

The ethylene/acid copolymer film is thereafter applied to the mandrel in the same manner, being cut first into 4 inch wide tape. It is of course possible to wind both materials in a straight convolute wind using full width film, i.e. 10-foot width. The mandrel containing the preform is then removed from the winder. The mandrel is finally collapsed and the unbonded pipe is slipped off and is then ready for heat bonding.

Some of the materials used for the first wrap about the mandrel may tend to stick to the rubber diaphragm in the molding apparatus, details of which are described in subsequent paragraphs. To avoid this a first film layer of "Teflon" polytetrafluoroethylene or "Tedlar" polyvinyl fluoride may be first wrapped around the mandrel to prevent sticking by subsequent layers.

After the preformed unbonded pipe was removed from the mandrel it was transferred to an apparatus for bonding. The unbonded preformed pipe at this point was a soft tube having a wall thickness of about ½ inch, the inside diameter being about 3 inches. This material was expanded in the bonding operation to an outside diameter of about 4 inches.

The pipes were trimmed to 10-foot lengths. Finally the ends were sealed by heating to incipient melting over a hot iron taking care to avoid over-heating and deorientation of the molecular structure of the film-fibrils.

The unbonded pipe 14 was placed in a steam-jacketed cylinder 12 as shown in FIGURE 3. A long expandable rubber tube 13 was then inserted in the pipe 14 so that the two were concentrically positioned. The expandable rubber tube was made air tight by fastening it between flanges 15 of the jacketed pipe, which was in turn connected to a steam line 16 and also to an air line 17. An air pressure (35 p.s.i.g.) was next applied to the rubber tube through the air supply pipe 17 causing the rubber tube to expand so that the unbonded pipe was pressed against the side walls of the cylinder 18. Vacuum was next applied to the space outside the pipe by way of vacuum line 19 to remove air entrapped in this annular space and in the interstices between the film-fibrils of the unbonded pipe. After evacuation of the air space around the pipe, the air pressure within the expandable tube was released through the air supply pipe 17. Steam was then supplied to the jacketed cylinder through inlet 22 and to the inside of the expandable rubber tubing diaphragm through inlet 16. The steam pressure was controlled to give a pressure on the unbonded pipe of about 32 to 33 p.s.i.g. and a temperature of about 136° C. The condensate was passed through traps in outlet lines 20 and 21. Under these conditions of pressure and temperature, the film-fibrils in the pipe were heat-welded together at their crossover points without destruction of the film-fibrils and without fully removing their orientation. Heat and pressure were applied for 20 minutes, then the steam supply was turned off, 35 p.s.i.g. air was applied to the inside of the rubber tube, and cold water introduced through line 22 into the jacket of the cylinder. Cooling was carried out under pressure to prevent the hot pipe from shrinking. After the mold became cool, air pressure was released via line 23 and the finished pipe was removed from the mold. During the heat-bonding step a consolidation of the film-fibrils occurred and the outside and inside layers were both stretched transversely and the wall thickness reduced.

Epoxy adhesive

The epoxy adhesives for use in forming the couplings of the invention may be formed of a 1,2-epoxide resin and a polyfunctional curing agent or hardener. Generally the 1,2-polyepoxides which are useful in this invention are obtained by the reaction of phenolic compounds with epichlorohydrin in the presence of a base. The resulting resins may be either bifunctional, trifunctional or tetrafunctional. Representative phenols which may be reacted with epichlorohydrin to obtain 1,2-polyepoxides which are useful in this invention include bisphenol A, tetrachlorobisphenol A, and diphenolic acid. Aliphatic diols and triols may also be used with epichlorohydrin. Intermediate degrees of polymerization may characterize the 1,2-polyepoxide, such as when the epoxide chains have multiple functional groups which may interact to produce longer functional chains. Other representative examples of 1,2-polyepoxides which may be used are described in "Epoxy Resins" by Henry Lee and Kris Neville, McGraw-Hill, 1957, New York. Preferably the 1,2-polyepoxide is a liquid and is used without dilution or filling with pigment. The epoxy formulation should preferably be one which will give a high impact type of resin to provide a structure which will not crack when subjected to heavy mechanical or hydraulic loads, epoxy resins with low viscosity, and which cure at room temperature are desirable for this reason. A satisfactory 1,2-polyepoxide resin is the diglycidyl ether of bisphenol A which is represented by the following structural formula:

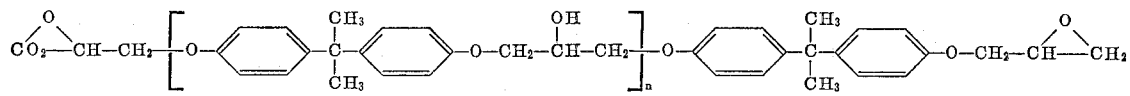

A wide variety of curing agents may be used in curing the 1,2-polyepoxides to yield the epoxy adhesives of this invention. The cure may be carried out in either a "one stage" or "two stage" cure. The preferred class of curing agents are polyfunctional amines. Representatives of this class of curing agents are ethylenediamine, diethylenetriamine, triethylenetetramine, tetraethylenepentamine, dicyandiamide, piperidine, N-(hydroxyethyl) diethylenetriamine, primary and secondary aliphatic and aromatic amines, hydroxylamines. Dicarboxylic acids and anhydrides such as phthalic acid, pyromellitic anhydride, endophthalic acid and the like may also be used as well as mixtures of any thereof. The amount of curing agent which may be employed in the 1,2-polyepoxide resin will depend to some extent on the nature of the 1,2-polyepoxide resin and the curative. In particular cases "self curing" 1,2-polyepoxides may be used advantageously as adhesives, in which the curatives are "built into" the 1,2-polyepoxide. Small amounts of conventional fillers may be added to the 1,2-polyepoxide adhesives if desired. Examples of such fillers are well known in the art and include sand, silica, aluminum powder, graphite, asbestos, etc.

The amount of the 1,2-polyepoxide film which is necessary to give adequate adhesion between the ethylene/acid copolymer outer layer 7 of the pipe and the sleeve-like fitting 4 is not particularly critical. The minimum amount, which should be at least enough to create a continuous film so as to uniformly distribute stress, may in fact vary depending upon the nature of the material out of which the fitting has been fabricated.

*Coupling formation*

The sleeve-like fitting has a generally cylindrical inner circumference for receiving the pipe end 3, which has a generally cylindrical outer circumference, in free-sliding, close-fitting relationship. It will be understood that the surface of the ethylene/acid copolymer layer 7 need not be flush with the remainder of the tubular body 1, as shown in FIGURE 1, but rather may form a somewhat larger diameter shoulder.

Before joining the pipe end or ends to the sleeve-like fitting 4 it is frequently advantageous to abrade the ethylene/acid copolymer layer, i.e. with sandpaper, to develop roughness in the surface. An appropriate mixture of epoxy resin and hardener is then applied to both of the mating surfaces and the end of the pipe is slid into the fitting into concentric relationship. The coupling is allowed to stand at room temperature to effect complete cure of the epoxy adhesive before use. The curing period may be for a few minutes to 24 hrs., depending upon the curing speed of the epoxy resin and hardener combination. A permanent fluid-tight seal is thereby obtained.

A basic requirement for an above ground coupling is the ability to hold a seal while maintaining the end-thrust developed under operating conditions. The end-thrust developed (working pressure times cross-sectional area of the pipe) tends to pull the joint apart. In the coupling described herein an adhesive bond is obtained with sufficient shear strength to resist this end-thrust. This bond strength may be expressed in terms of shear strength $Ss$ as shown in the following equation:

$$Ss = \frac{PwD}{2L}$$

$Ss$ is the shear strength in pounds/in.$^2$, D is the pipe diameter in inches, $Pw$ is the working pressure in the pipe in pounds/in.$^2$ and L is the length of the coupling in inches. Assuming a working pressure of 150 p.s.i. in a 4 inch diameter pipe, with a 6-inch long coupling, the required shear strength is 50 p.s.i. For the same shear strength requirement, an 8 inch diameter pipe would require a 12-inch long coupling.

As an additional requirement, the coupling should have hoop strength, as hereinbefore described, above 7,000 p.s.i.

It is of course useful to pigment the surface of the pipe and the entire copolymer layer to give better ultraviolet resistance. Carbon black, pigments and other fillers may be used for this and other purposes provided, of course, they do not seriously lower the ability of the ethylene/acid copolymer layer 7 to adhere to the tubular body 1 or the epoxy adhesive.

While the invention is particularly described with respect to connecting two pipe ends by means of a cylindrical sleeve it is obvious that the invention can be used in many other forms, all of which are contemplated by the present invention. One could, for example, use an outer fitting in the form of a T, an elbow, or a Y. In addition the inner fitting may take a variety of forms. The inner fitting may also be a pipe fitting or part of a plumbing fixture provided that it has the structure of the invention, including the ethylene/acid copolymer exterior on a polyolefin tubular body. The outer and inner fittings need not be truly cylindrical provided that they are designed to fit closely with each other. Where the sleeve-like fitting has but one end portion or opening for receiving the end of a pipe section, it constitutes an effective and convenient means for capping the end of a plastic pipe section. Other interior layers, e.g. gas or water impermeable layers may be provided on the interior of the polyolefin body depending upon the intended use.

EXAMPLE

Pipe of film-fibril material was made from a fibrous flash-spun sheet of linear polyethylene, the polymer having a density 0.96 g./cm.$_3$ and a melt index 0.5 g./10 minute (determined by ASTM Method D–1238–57T, Condition E). The pipe was lined internally with a film layer of branched-chain polyethylene 0.010 inch thick to provide a pipe which would retain water at high pressures and on the outside for a length of 3 inches from each end it was provided around its circumference with a layer of ethylene/methacrylic acid copolymer film which was .020 inch thick. The ratio of the respective polymerized units in the copolymer was 95/5. The entire structure was formed on a 13-foot long mandrel with expanded 3.03 inch diameter by winding the branched-chain polyethylene film layer, the film-fibril sheet layers, and the end layers of ethylene/acid copolymer film successively around the mandrel in the manner described above. Several portions of unbonded pipe structure, which were trimmed to 10 feet in length, were thus prepared.

The unbonded pipe structure was removed from the mandrel and transferred to a bonding device, also described above, wherein an expandable bladder increased the inside diameter of the pipe from 3.03 inches to 3.79±0.03 in. and compressed the pipe wall to a thickness of 0.075 in. while heating in a mold at 140° C. The density of the pipe wall after bonding was about 0.75 g./cm.$^3$. The copolymer film layer at the outside ends of the pipe was thoroughly bonded by the heat-treatment to the film-fibril pipe which was in turn self-bonded by the heat treatment. Likewise the inner film layer of branched-chain polyethylene was bonded to the film-fibril material.

An outer fitting comprising a cylindrical sleeve was prepared by machining a solid cylindrical casting prepared from an epoxy resin. This resin was cast in the form of a cylinder with outside diameter 4.65 inches using an epoxide/amine hardener mixture. A suitable formulation comprised a liquid epoxy resin prepared from bisphenol A and epichlorohydrin, the resin having the general formula given above and having an epoxy equivalent weight of 185–195 (ASTM D–1652), a viscosity of 11,000 to 13,000 cps. at 25° C. (ASTM D–1824), a specific gravity at 25° C. of 1.15–1.17 (ASTM D–1475), and contained no inorganic filler. To 100 parts of the liquid resin was added with stirring 29 parts by weight of an amine hardener having an amine value of 8.5–9.5 meq./g. a specific gravity of 1.00–1.02 at 25° C. (ASTM D–1475) and a viscosity of 14–25 cps. at 25° C. (ASTM D–1824). The hardener has approximately the general formula

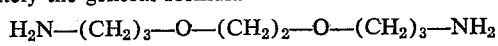

The hardener and epoxy resin were mixed just prior to pouring into the mold.

The center of the epoxy casting was removed in the machining operation to give a hollow cylinder with a length of 6 inches an inside diameter of 3.95 inches. The inside diameter of the sleeve was thus 0.01 inch larger than the outside diameter of the pipe, thus providing a close-fitting, free-sliding relationship.

The opposing ends of two such pieces of pipe were prepared for permanent joining by abrading with coarse sandpaper (No. 80) and applying the same formulation of epoxy resin mixed with amine hardener as was used for preparing the solid cylindrical casting, the amine hardener being added just before applying to the two pipe ends.

Two ends of the pipe were then permanently coupled by means of the cast epoxy sleeve by sliding the pipes into the sleeve so that the pipes met approximately in the center of the hollow sleeve. The epoxy resin and hardener was allowed to cure by standing at room temperature for 24 hours.

The resulting cured joint was tested above ground in a pipeline. The joint resisted a water pressure of 450 p.s.i. with no signs of leakage. The joint therefore withstood a shear stress of greater than 150 p.s.i.

What is claimed is:

1. A pipe coupling for confining fluid therein comprising, an inner pipe section having an end of generally cylindrical outer circumference, an outer pipe section of generally cylindrical inner circumference for receiving said end of the inner pipe section in close fitting relationship, and an intermediate layer of epoxy adhesive securely joining said pipe sections, said outer pipe section exhibiting a growth of less than 5% at 3000 p.s.i. and 70° C. and having an inner surface adherent to epoxy adhesive, said inner pipe section comprising a polyolefin tubular body having fused thereto an outer surface layer comprising an ethylene/acid copolymer with a major proportion by weight of polymerized units of ethylene and 1 to 8% by weight of polymerized units of an alpha, beta-unsaturated aliphatic acid of 3 to 8 carbon atoms per molecule, said copolymer having a melt index of 0.01 to 30 grams/10 minutes, said layer of copolymer being at least 25 microns thick.

2. Pipe coupling according to claim 1 wherein said polyolefin tubular portion of the inner pipe section comprises linear polyethylene.

3. Pipe coupling according to claim 1 wherein said polyolefin tubular portion of the inner pipe section comprises a coherent layer of plexifilamentary material composed of networks having a surface area greater than 2 m.$^2$/g. and comprising a three-dimensional integral plexus of crystalline polyolefin fibrous elements, said elements being coextensively aligned with the network axis and having the structural configuration of oriented film-fibrils, an average film thickness of less than 4 microns and an average electron diffraction orientation angle of less than 90°; within said coherent layer the fibrous elements being heat-welded and compacted together at their cross-over points but retaining their said orientations at the center of thickness of said coherent layer, the density of said coherent layer being 0.65 to 0.90 g./cm.$^3$.

4. Pipe coupling according to claim 3 wherein said crystalline polyolefin fibrous elements are comprised of linear polyethylene.

5. Pipe coupling according to claim 1 wherein said outer pipe section comprises a casting of epoxy resin.

6. The pipe coupling of claim 1 wherein said outer pipe section is in the form of a sleeve, and comprising additionally a second inner pipe section, opposite ends of the sleeve being similarly formed and similarly receiving adjacent ends of the two said inner pipe sections in fluid tight relationship.

References Cited

UNITED STATES PATENTS

| | | | |
|---|---|---|---|
| 3,008,493 | 11/1961 | Roe | 138—146 |
| 3,183,941 | 5/1965 | Woodell | 138—141 |

FOREIGN PATENTS

| | | |
|---|---|---|
| 655,298 | 1/1963 | Canada. |

HAROLD ANSHER, *Primary Examiner.*